(12) United States Patent
Fujii

(10) Patent No.: US 11,330,115 B2
(45) Date of Patent: May 10, 2022

(54) IMAGE SCANNING DEVICE

(71) Applicant: Brother Kogyo Kabushiki Kaisha, Nagoya (JP)

(72) Inventor: Isamu Fujii, Yokkaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/104,998

(22) Filed: Nov. 25, 2020

(65) Prior Publication Data

US 2021/0168243 A1 Jun. 3, 2021

(30) Foreign Application Priority Data

Nov. 29, 2019 (JP) .............................. JP2019-217637

(51) Int. Cl.
*H04N 1/00* (2006.01)
*H04N 1/387* (2006.01)
*H04N 1/10* (2006.01)
*H04N 1/053* (2006.01)

(52) U.S. Cl.
CPC ..... *H04N 1/00037* (2013.01); *H04N 1/00005* (2013.01); *H04N 1/00018* (2013.01); *H04N 1/00068* (2013.01); *H04N 1/00082* (2013.01); *H04N 1/00551* (2013.01); *H04N 1/053* (2013.01); *H04N 1/1061* (2013.01); *H04N 1/3877* (2013.01)

(58) Field of Classification Search
CPC . H01L 2224/16225; H01L 2224/32225; H01L 2224/73204; H01L 2924/00; H01L 2224/83192; H04N 1/00005; H04N 1/00018; H04N 1/00037; H04N 1/00068; H04N 1/00082; H04N 1/00551; H04N 1/053; H04N 1/1061; H04N 1/387; H04N 1/3877; H04N 1/3878
USPC ....................................................... 358/1.15
See application file for complete search history.

(56) References Cited

U.S. PATENT DOCUMENTS 5,513,017 A * 4/1996 Knodt .................... G03G 15/50
 358/471
7,551,332 B2 * 6/2009 Itoi ...................... H04N 1/1017
 355/25

(Continued)

FOREIGN PATENT DOCUMENTS

JP 2006-262535 A 9/2006
JP 2009-010710 A 1/2009

(Continued)

*Primary Examiner* — Negussie Worku
(74) *Attorney, Agent, or Firm* — Banner & Witcoff, Ltd.

(57) ABSTRACT

An image scanning device has a platen, an openable cover, a cover sensor, a scanning unit, a condition setting unit enabling a user to set a first condition, and a controller. The controller is configured to detect an opening state of the cover based on a detection signal output by the cover sensor and obtain the image data representing a partial image which is an image of a first end portion of a scannable area of the scanning unit. When the cover is in the closed state, the controller applies an image processing based on the first condition set through the condition setting unit, and when the cover is in the opened state, the controller applies the image processing based on a second condition which is a particular condition set in advance and different from the first condition.

11 Claims, 7 Drawing Sheets

(56) References Cited

U.S. PATENT DOCUMENTS

| | | | | |
|---|---|---|---|---|
| 7,853,166 | B2* | 12/2010 | Yamada | G03G 15/5016 |
| | | | | 399/81 |
| 8,451,516 | B2* | 5/2013 | Chen | H04N 1/0075 |
| | | | | 358/497 |
| 9,332,146 | B2* | 5/2016 | Tao | H04N 1/00557 |
| 10,291,801 | B2* | 5/2019 | Maeda | H04N 1/00408 |
| 2005/0140991 | A1 | 6/2005 | Ogiwara et al. | |
| 2007/0047279 | A1* | 3/2007 | Evans | G06F 9/541 |
| | | | | 365/1 |
| 2007/0297818 | A1* | 12/2007 | Yamada | G03G 15/5016 |
| | | | | 399/38 |
| 2009/0180155 | A1 | 7/2009 | Kato et al. | |
| 2009/0185240 | A1 | 7/2009 | Kato et al. | |
| 2012/0294528 | A1* | 11/2012 | Li | H04N 1/3873 |
| | | | | 382/173 |
| 2017/0083762 | A1* | 3/2017 | Segalovitz | G06K 9/00463 |
| 2018/0288253 | A1* | 10/2018 | Maeda | H04N 1/00408 |
| 2019/0230246 | A1* | 7/2019 | Abaquita | H04N 1/3876 |

FOREIGN PATENT DOCUMENTS

| | | |
|---|---|---|
| JP | 2009-164807 A | 7/2009 |
| JP | 2012-227569 A | 11/2012 |

* cited by examiner

IMAGE SCANNING DEVICE

CROSS-REFERENCE TO RELATED APPLICATIONS

This application claims priority under 35 U.S.C. § 119 from Japanese Patent Application No. 2019-217637 filed on Nov. 29, 2019. The entire subject matter of the application is incorporated herein by reference.

BACKGROUND

Technical Field

The present disclosures relate to an image scanning device.

Related Art

Conventionally, there has been known a flatbed type image scanning device (e.g., a flatbed scanner) which is generally configured such that a scanning unit is movably provided under a platen (i.e., a platen glass). The scanning unit typically has a line sensor extending in a main scanning direction and configured to scan an image, along the main scanning direction, of an original sheet placed on the platen. As the scanning unit moves in a sub scanning direction perpendicular to the main scanning direction with performing the scanning in the main scanning direction, an entire image of the original is scanned.

Typically, the conventional image scanning device is configured such that an entire scannable area is roughly scanned by performing a pre-scan. Then, an area where the original sheet is placed on the platen is detected based on image data obtained by the pre-scanning. When a main-scan is performed, the scanning unit is controlled not to scan the entire scannable area but only an area where the original sheet exists based on the pre-scanning result. There is also known an scanning device which is configured to scan the entire scannable area, not as the pre-scan but as the main-scan, determines the original sheet area, and extracts the data within the original sheet area as determined.

In order to determine the area where the original sheet exists within the entire scannable area, coordinates of two corners of the original sheet in one end portion are detected based on the image data obtained by scanning the entire scanning area. Then, a size and a tilt angle of the original sheet with respect to the platen are presumed based on the coordinates of the two corners, thereby an area where the original sheet is assumed to exist within the entire scannable area being determined.

SUMMARY

According to the above-described technique, since the scanning unit is controlled such that only the area where the original sheet exists (hereinafter, referred to a target area) is scanned, the image data of the original sheet can be obtained at a time when the scanning is completed.

In the above-described conventional technique, the target area is determined based on the assumption that the original sheet has a rectangular shape. However, when an original, such as a book-type original, is placed on the platen in an opened manner, front/rear sides or right/left sides of the rectangular shape may be broken in the middle thereof due to a spread of the book-type original (i.e., an opened state of the book). In such a case, the target area may not be set appropriately, and an image chipping may occur (i.e., a part of an image to be read may not be read) since the target area may not coincide with the shape of the original.

According to aspects of the present disclosures, there is provided an image scanning device, which is provided with a platen, a cover rotatably provided to the image scanning device, the cover being configured to be opened to expose the platen and closed to cover the platen, a cover sensor configured to output a detection signal based on an opening state of the cover, a scanning unit configured to sequentially scan an image, within a scannable area, from a first end toward a second end of the scannable area, an original sheet placed on the platen being included in the scannable area, the scanning unit generating image data representing the scanned image, a condition setting unit enabling a user to set a first condition to be used when the image is scanned, and a controller. The controller is configured to perform detecting the opening state of the cover based on the detection signal output by the cover sensor, and obtaining the image data representing a partial image which is an image of a first end portion of a scannable area of the scanning unit. When the cover is in the closed state, the controller applies an image processing based on the first condition set through the condition setting unit, and when the cover is in the opened state, the controller applies the image processing based on a second condition which is a particular condition set in advance and different from the first condition.

According to aspects of the present disclosures, there is provided an image scanning device, having a platen, a cover rotatably provided to the image scanning device, the cover being configured to be opened to expose the platen and closed to cover the platen, a cover sensor configured to output a detection signal based on an opening state of the cover, a scanning unit configured to sequentially scan an image, within a scannable area, from a first end toward a second end of the scannable area, an original sheet placed on the platen being included in the scannable area, the scanning unit generating image data representing the scanned image, and a controller. The controller is configured to perform detecting the opening state of the cover based on the detection signal output by the cover sensor, obtaining the image data representing a partial image which is an image of a first end portion of a scannable area of the scanning unit, and setting a first condition based on the partial image to be used an image processing. When the cover is in the closed state, the controller applies the image processing based on the first condition. When the cover is in the opened state, the controller applies the image processing based on a second condition which is a particular condition set in advance and different from the first condition.

BRIEF DESCRIPTION OF THE ACCOMPANYING DRAWINGS

Figure 2:
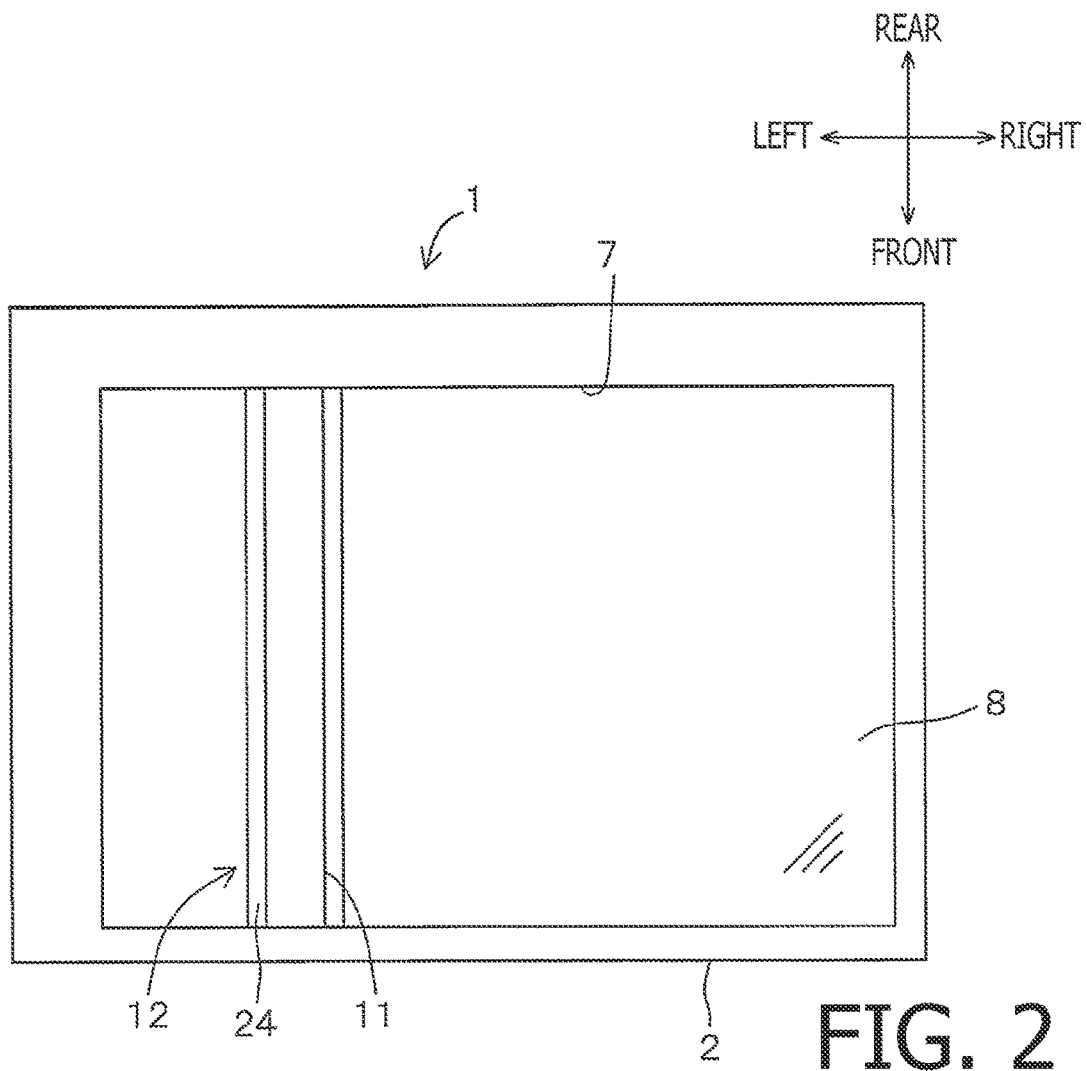

FIG. 2 schematically shows a plan view of the image scanning device.

Figure 3:
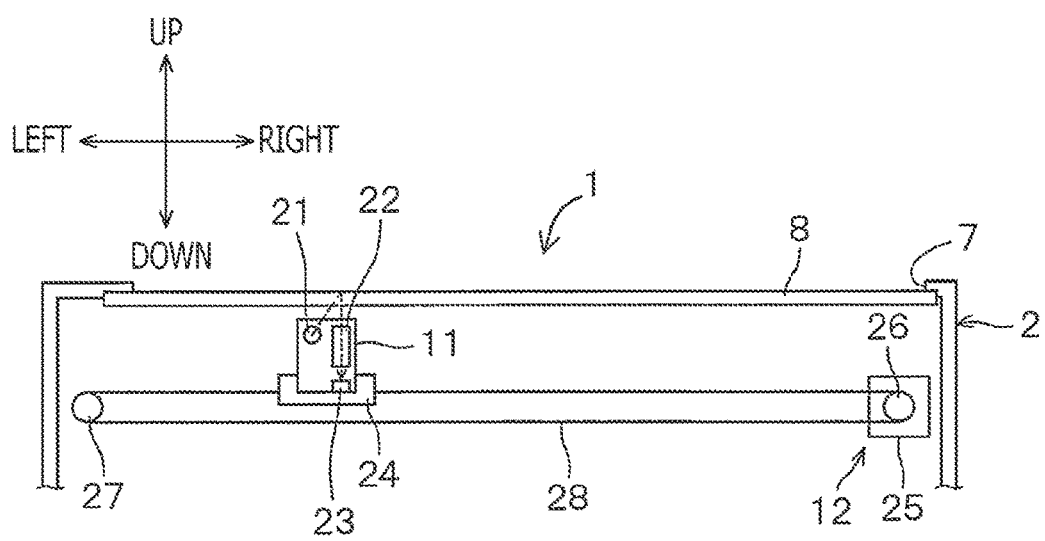

FIG. 3 schematically shows a cross-sectional front view of the image scanning device.

Figure 4:
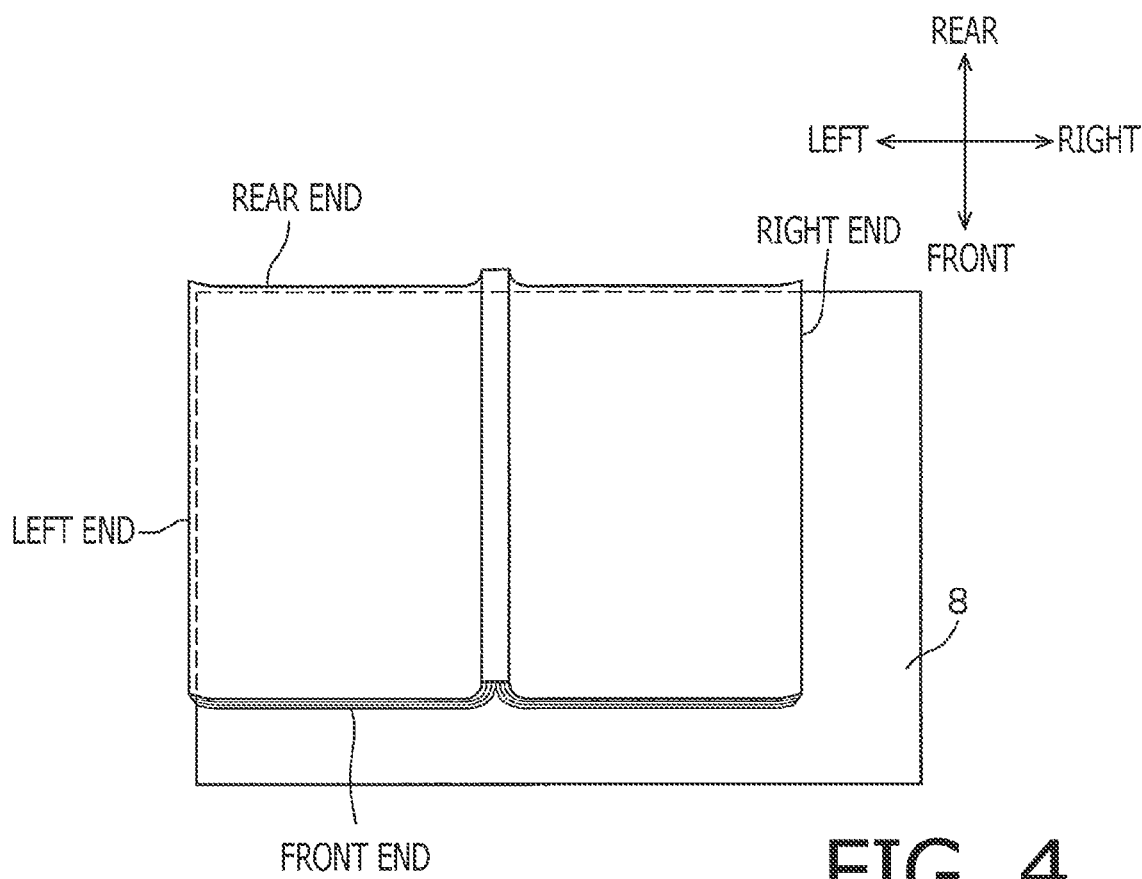

FIG. 4 shows a case where a book-type original is placed on a platen.

Figure 5:
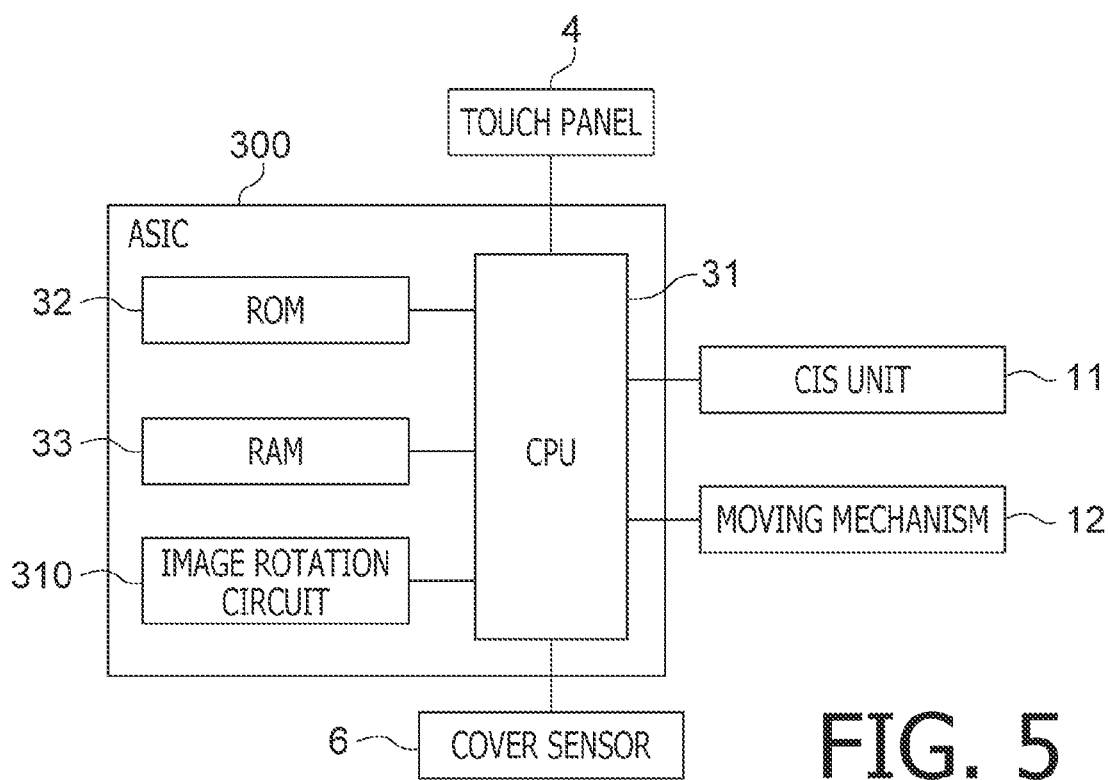

FIG. 5 is a block diagram showing an electrical configuration of the image scanning device.

Figure 6A:
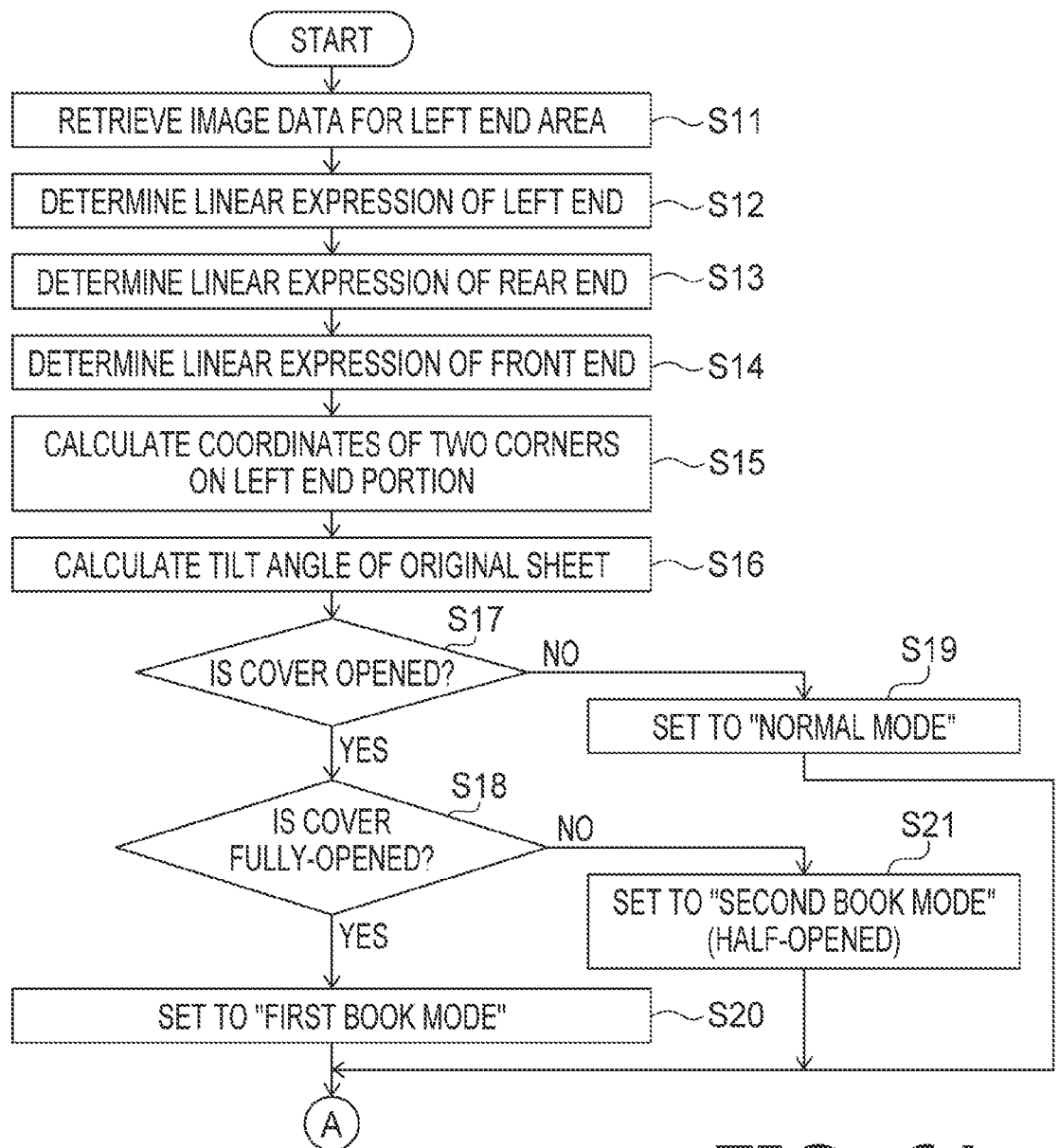
Figure 6B:
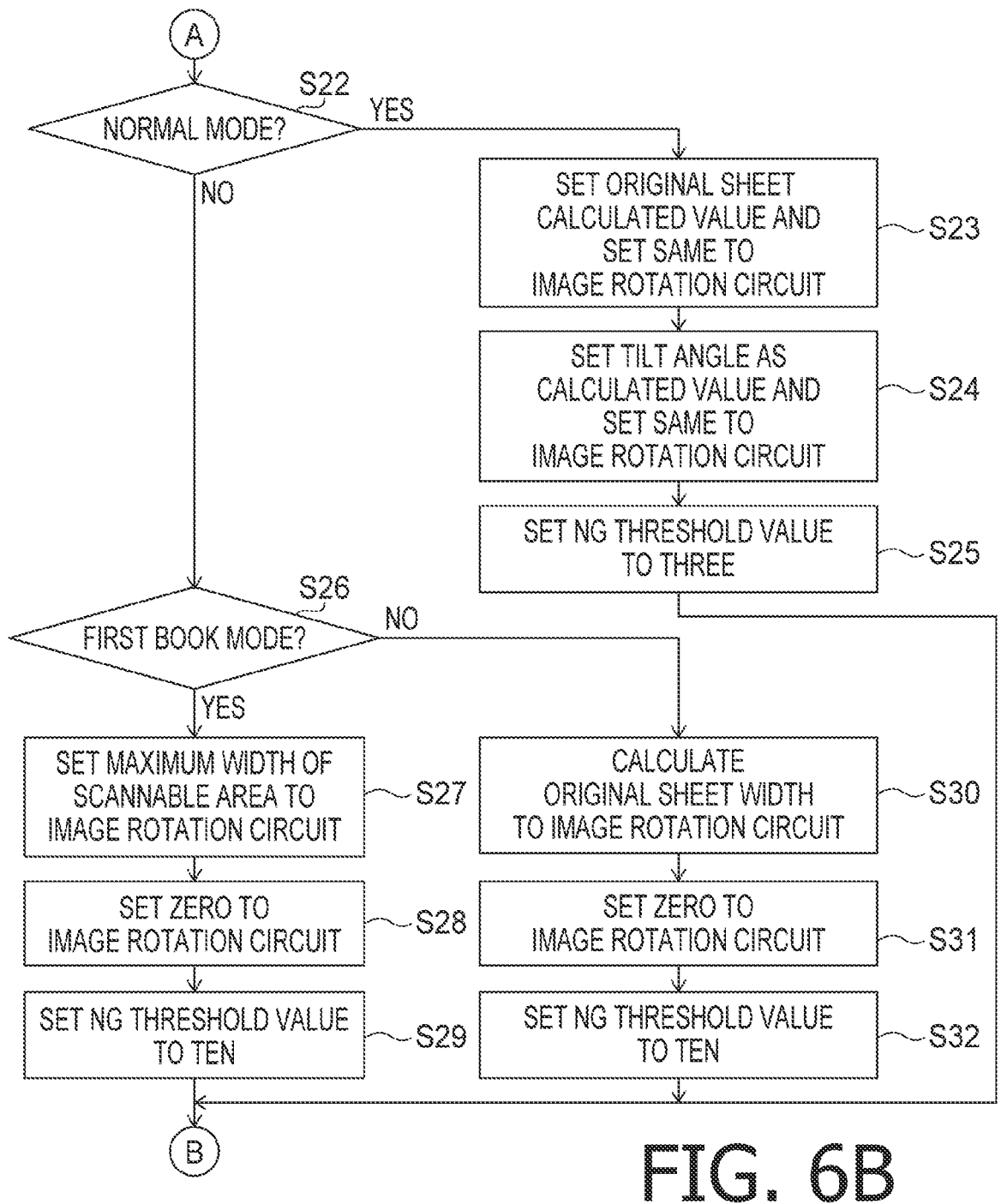
Figure 6C:
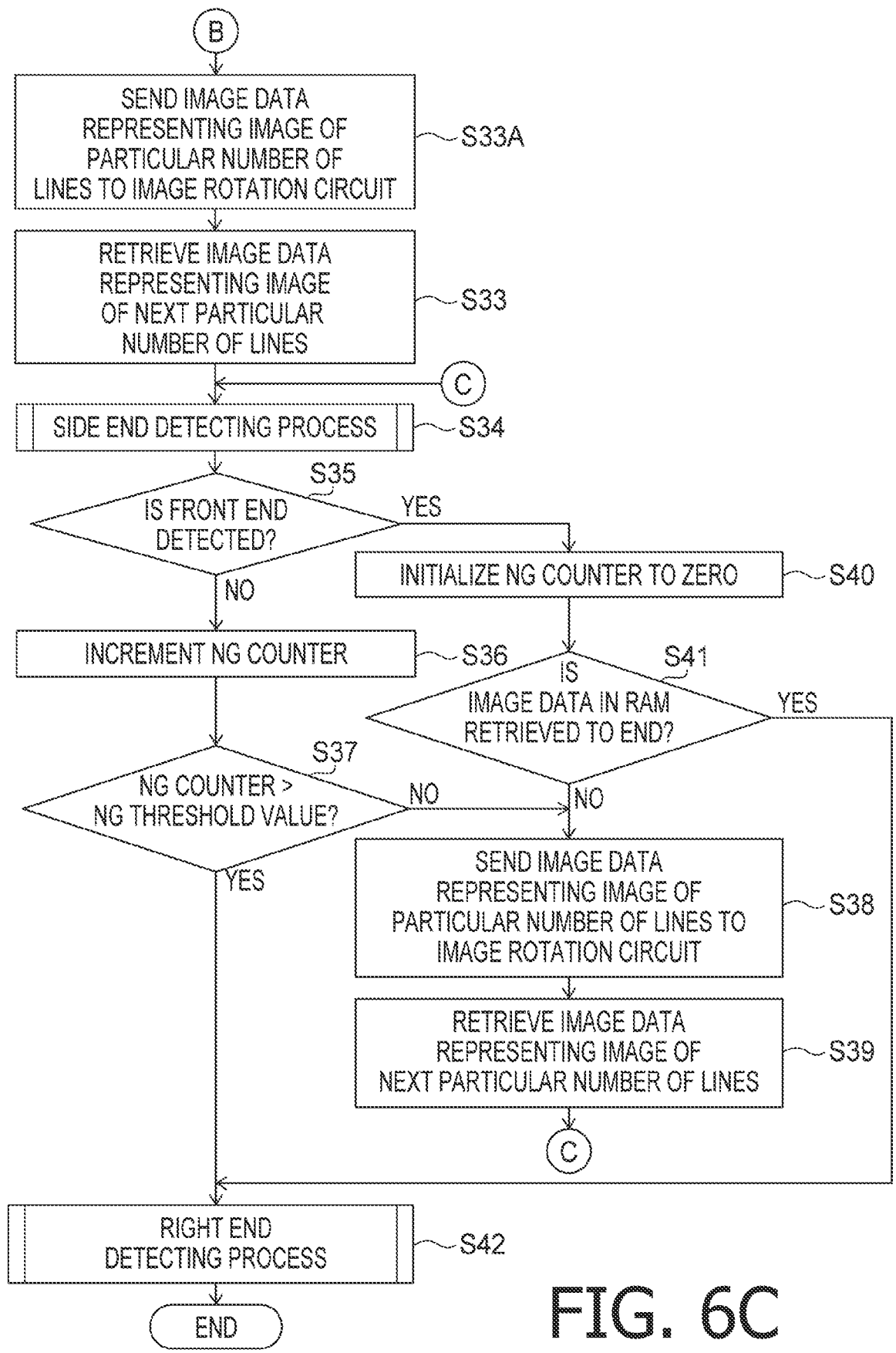

FIGS. 6A-6C show a flowchart illustrating an example of an original extracting process.

DETAILED DESCRIPTION OF EMBODIMENT

Hereinafter, referring to the accompanying drawings, an embodiment according to aspects of the present disclosures will be described.

Mechanical Configuration of Image Scanning Device

Figure 1:
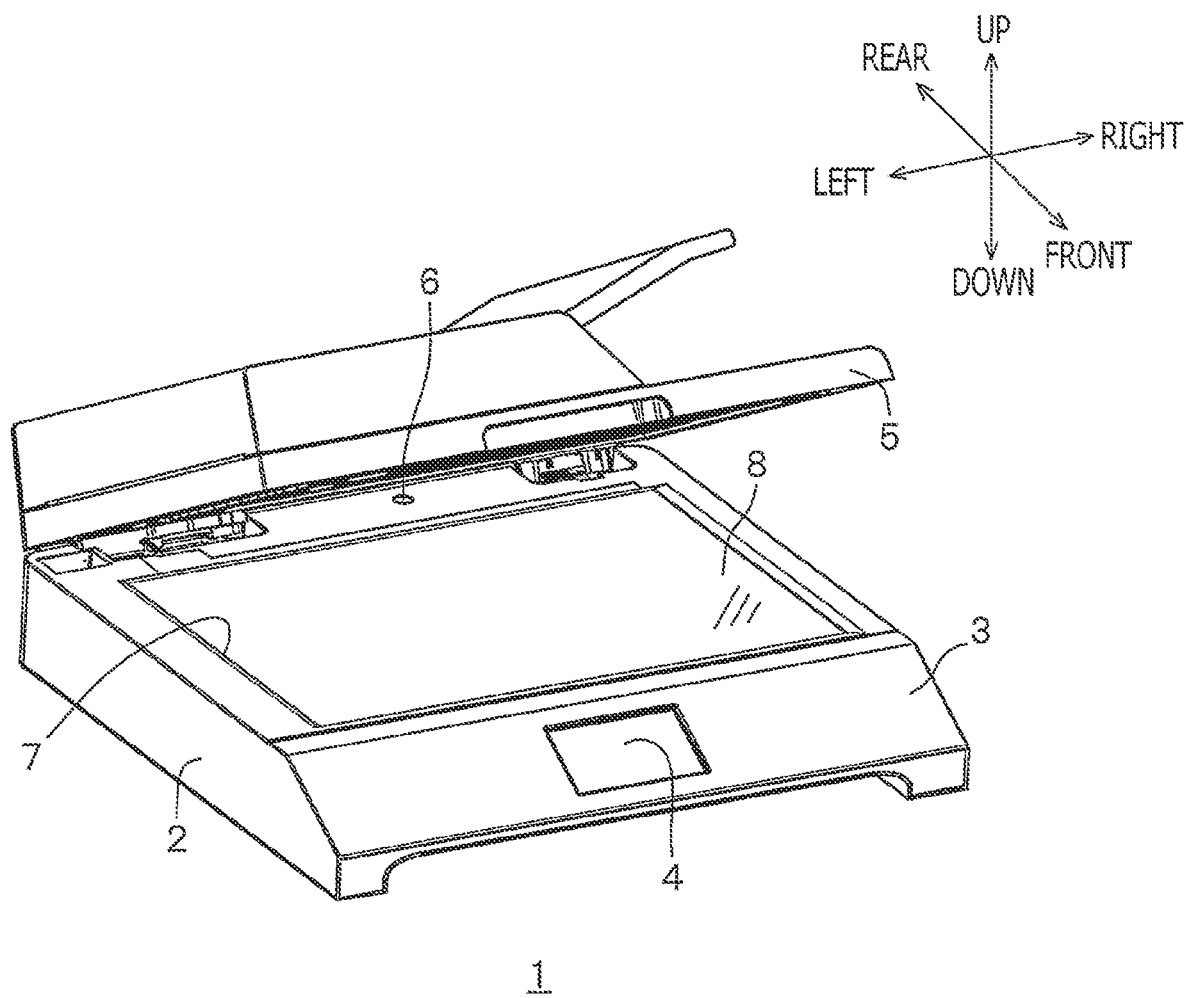
FIG. 1 is a perspective view of an image scanning device according to an embodiment of aspects of the present disclosures.

An image scanning device 1 shown in FIG. 1 is a flatbed type image scanning device. The image scanning device 1 may be employed, in conjunction with a printing device, in an MFP having functions of scanning, printing and the like. In such an MFP, the image scanning device 1 is typically arranged above the printing device.

The image scanning device 1 has a housing 2 having an approximately rectangular parallelepiped shape. An inclined surface 3 descending toward the outside is formed along one side of the housing 2. On the inclined surface 3, a touch panel 4 is arranged. The touch panel 4 is an example of a condition setting unit. Through the touch panel 4, a user can input various settings and an instruction to start scanning.

In the following description, the side on which the touch panel 4 is arranged will be referred to as a front side of the image scanning device 1 (see FIG. 1). Further, as shown in FIG. 1, rear, front, left and right sides (directions) will be defined when the image scanning device 1 is viewed from the front side. Arrows indicating the directions, including up and down directions, are also shown in FIGS. 2-4.

A cover 5 is rotatably connected to a rear-end portion of the housing 2. The cover 5 is rotatable about an axis extending in a right-left direction between an opened position and a closed position. When the cover 5 is located at the opened position, the front side of the cover 5 is raised from a top surface of the housing 2 to expose the same as shown in FIG. 1, while when located at the closed position, the cover 5 fully covers the top surface of the housing 2.

Figure 1A:
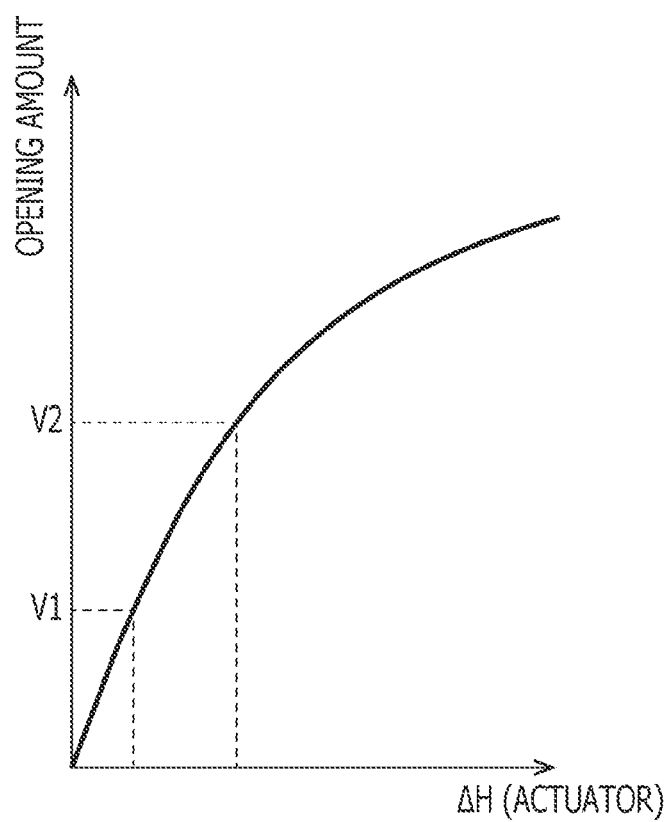
FIG. 1A is a graph showing a relationship between an opening amount of a cover and a moving amount of an actuator.

In order to detect an opening state (i.e., an opened or a closed state) of the cover 5, a cover sensor 6 is arranged at a rear-end portion on the top surface of the housing 2. The cover sensor 6 could be of any type, and according to the present embodiment, for example, the cover sensor 6 includes an actuator that is movable in an up-down direction in association with a rotational position of the cover 5. The actuator 6 may be urged upward by an urging member to be urged to contact a lower surface of the cover. Depending on the opening state of the cover 5, the actuator is depressed by an amount corresponding to an opening amount of the cover 5 with respect to the top surface of the housing 2. As shown in FIG. 1A, the opening amount (e.g., the rotating angle) of the cover 5 can be detected based on the moving amount ΔH, in the up-down direction, of the actuator of the cover sensor 6. According to the above configuration, the cover sensor 6 outputs a detection signal corresponding to the detected opening amount of the cover 5.

According to the present embodiment, the cover sensor 6 outputs three different detection signals depending on whether the cover 5 is:

(A) in a closed state where the opening amount of the cover 5 (e.g., an opening angle with respect to a plane of the top surface of the housing 2 or an uplifted amount from the top surface of the housing 2) is less than a first particular value V1;

(B) in a half-opened state where the opening amount of the cover 5 is equal to or more than the first predetermined value and less than a second particular value V2; and (C) in a fully-opened state where the opening amount of the cover 5 is equal to or more than the second particular value V2.

On the top surface of the housing 2, a rectangular opening 7 is defined by four ends extending in the front-rear direction and the right-left direction is formed. Further, a platen 8 on which an original sheet is to be placed is provided. The platen 8 is a plate member having a rectangular shape and fitted in the opening 7 from below. An example of the platen 8 is a glass plate. At least an upper surface of the platen 8 is formed planar. The platen 8 is surrounded and supported by the ends of the housing 2 defining the opening 7.

As shown in FIGS. 2 and 3, a CIS unit 11 and a moving mechanism 12 configured to move the CIS unit 11 in the right-left direction (which is a sub-scanning direction) are provided below the platen 8. It is noted that the CIS unit 11 is an example of a scanning unit.

As shown in FIG. 3, the CIS unit 11 is provided with a light source 21, a rod lens array 22 and an image sensor 23, which are built-in in the CIS unit 11. The light source 21 linearly extends in the front-rear direction (which is the main scanning direction) and is configured to emit the linearly distributed light, which extends in the main scanning direction, toward the platen 8 (i.e., toward the original sheet placed on the platen 8 through the platen 8). The image sensor 23 is a linear image sensor having, for example, multiple light receiving elements arranged linearly in the main scanning direction.

The light emitted by the light source 21 illuminates, through the platen 8, the surface of the original sheet placed on the platen 8 and is reflected by the original sheet. The reflected light passing through the platen 8 and entering the image sensor 23 through the rod lens array 22 is received by the image sensor 23. Then, the image sensor 23 outputs electric voltages respectively generated by the photosensitive elements in accordance with the photoelectric conversion. The electric voltages output by the respective photosensitive elements are amplified by a gain control circuit, and then converted to digital pixel data by an A/D converter.

The A/D converter is of a well-known device and has, for example, an 8-bit (0-255 steps) resolution. The A/D converter is configured such that a voltage value less than a lower threshold is converted to 0, a voltage value more than an upper threshold is converted to 255, and the voltage value between the lower threshold and the upper threshold is converted to the pixel data corresponding to the voltage value. In this way, a scanning process of scanning an object (e.g., the original sheet) by one line along the main scanning direction is completed.

The moving mechanism 12 is configured to move the CIS unit 11 in the sub-scanning direction, which is perpendicular to the main scanning direction. The moving mechanism 12 includes a carriage 24 configured to support the CIS unit 11, a stepping motor 25 which is driven to rotate forwardly and reversely, a driving pulley 26 which is driven by the motor 25 to rotate, a sub pulley 27 which is paired with the driving pulley 26, and an endless belt 28 which is looped around the driving pulley 26 and the sub pulley 27. The driving pulley 26 is arranged at the right end part inside the housing 2 such that the rotation axis thereof extends in the front-rear direction (i.e., the main scanning direction). The sub pulley 27 is arranged at the left end part inside the housing 2 such that the rotation axis thereof extends in the front-rear direction and is arranged on the same height level as the rotation axis of the driving pulley 26. The carriage 24 is secured to the belt 28. The belt 28 is moved as the driving pulley 26 rotates, and as the belt 28 moves, the carriage 24 is moved in the sub-scanning direction, which coincides with the right-left direction in this embodiment. Further, when the driving pulley 26 rotates and the belt 28 moves, the sub pully 27 is driven by the belt 28 to rotate.

When the original sheet is scanned, the cover 5 is initially located to the opened position and the original sheet is placed on the platen 8 such that, as shown in FIG. 4, left and rear ends of the original sheet respectively contact the left and rear ends of the opening 7. Next, after the original sheet is placed on the platen 8, the cover 5 is closed so that the original sheet is covered by the cover 5 from the above. Thereafter, when the user operates the touch panel to start scanning, the CIS unit 11 is moved, by the moving mechanism 12, in the sub-scanning direction, and the surface of the original sheet contacting the platen 8 is scanned line by line.

In the following description, right and left sides of the original sheet will be referred to as right and left ends, respectively, and front and rear sides of the original sheet will be referred to as front and rear ends, respectively. Further, right, left, front and rear sides of the platen 8 will be referred to as right, left, front and rear ends, respectively. Furthermore, right, left, front and rear ends of the opening 7 will be referred to as right, left, front and rear ends, respectively. Still further, regarding a detection applied to image data, a term "end" will be used to indicate a boundary between an image of an original sheet and an image of background (i.e., non-object part). That is, front, rear, right and left ends of the original sheet in an image represented by the image data correspond to the front, rear, right and left ends of the original sheet placed on the platen 8. Further, the front, rear, right and left ends in the image of the original sheet represented by the image data will simply be referred to as the front, rear, right and left ends of the original sheet. It is noted that the left end (of the original sheet or platen) is an example of a first end, and the right end (of the original sheet or platen) is an example of a second end.

Electrical Configuration of Image Scanning Device

As shown in FIG. 5, the image scanning device 1 has an ASIC 300 which includes a CPU 31, a ROM 32, a RAM 33 and an image rotation circuit 310. The CPU 31 is an example of a controller.

The ROM 32 is a non-volatile read-only memory. The ROM 32 stores programs to be executed by the CPU 31 and various pieces of data.

By executing the program stored in the ROM 32, the CPU 31 controls various parts of the image scanning device 1, including the touch panel 4, the CIS unit 11 and the moving mechanism 12, based on information input by the user through the touch panel 4 and based on the detection signal output by the cover sensor 6.

The RAM 33 is a rewritable volatile memory such as a flash memory or a DRAM, and is used as a work area when the CPU 31 executes the program.

The image rotation circuit 310 is an image processing circuit configured to apply a rotation correction to the image data based on the tilt angle of the original.

Original Extracting Process

Using the touch panel 4, the user can selectively set one of a manual setting and an automatic setting. When the manual setting is selected, the user can designate set information indicating the size and orientation of the original sheet placed on the platen 8 and the CIS unit 11 scans the original sheet according to the set information. When the automatic setting is selected, the CIS unit 11 scans the original sheet without requiring the user setting of the size and the orientation of the original sheet placed on the platen 8.

It is noted that when the original sheet is to be scanned by the CIS unit 11, one of the manual setting and the automatic setting should have been selected. When the touch panel 4 is operated to start scanning after one of the above settings has been selected, the CPU 31 controls the CIS unit 11 and the moving mechanism 12 to perform a scanning operation. In the scanning operation, the moving mechanism 12 moves the CIS unit 11 in the sub-scanning direction, and the CIS unit 11 scans the contacting surface of the original sheet placed on the platen 8 on a line basis, thereby image data representing the scanned image being sequentially stored in the RAM 33.

When the manual setting has been selected, scanning of the original sheet and processing of the image data representing the scanned image are performed according to a condition corresponding to the set information of the original sheet set by the user.

When the automatic setting is selected, the CPU 31 performs an original extracting process shown in FIGS. 6A, 6B and 6C in parallel with the scanning operation.

It is noted that, when the original sheet is scanned in accordance with the automatic setting, the CPU 31 performs the scanning process such that the CIS 31 scans an entire scannable area in the main scanning direction (i.e., the front-rear direction) and stores the image data in the RAM 33. The scanning process is repeated with the CIS being moved from the left end toward the right end of the platen 8, thereby the image data being sequentially stored in the RAM 33. Simultaneously, the CPU 31 starts the original extracting process shown in FIGS. 6A, 6B and 6C. The original extracting process is performed using the image data stored in the RAM 33.

In the original extracting process, the CPU 31 initially retrieves, from the RAM 33, image data representing an image corresponding to a left end area, which is a left end portion within the scannable area of the CIS unit 11. According to the present embodiment, the left end area is an area within a particular length (e.g., 3 cm) from the left end of the opening 7 (S11).

Next, the CPU 31 determines a linear expression of the left end of the original sheet based on the retrieved image data representing an image of the left end area (S12). Specifically, defining the left-rear corner of the opening 7 as an origin and using positions identified by coordinates in the main scanning direction and the sub-scanning direction as target points, the CPU 31 determines whether each target point is the left end point (i.e., a point on the left end of the original sheet). After the above determination has been made for all the target points, the CPU 31 determines a linear expression representing an approximate line of the points which are determined as the left end points.

In addition, the CPU 31 determines a linear expression of the rear end of the original sheet based on the retrieved image data representing the image of the left end area (S13). Specifically, the CPU 31 determines whether each target point is a rear end point (i.e., a point on the rear side of the original sheet). After the above determination has been made for all the target points, the CPU 31 determines a linear expression representing an approximate line of the points which are determined as the rear end points.

In addition, the CPU 31 determines a linear expression of the front end of the original sheet based on the retrieved image data representing the image of the left end area (S14). Specifically, the CPU 31 determines whether each target point is a front end point (i.e., a point on the front end of the original sheet). After the above determination has been made for all the target points, the CPU 31 determines the liner expression representing an approximate line of the points which are determined as the front end points.

Next, the CPU 31 calculates the coordinates of two corners on the left end portion of the original sheet (S15). The coordinates of a rear end corner in the left end portion of the original sheet can be calculated as coordinates of an intersection point of a line represented by the linear expression of the left end and a line represented by the linear expression of the rear end of the original sheet. Further, the coordinates of a front end corner in the left end portion of the original sheet can be calculated as coordinates of an intersection point of the line represented by the linear expression of the left end and a line represented by the linear expression of the front end of the original sheet.

Furthermore, the CPU 31 calculates a tilt angle of the original sheet (S16). The tilt angle is defined as an acute angle formed by the left end of the original sheet with respect to the main scanning direction. The tilt angle can be calculated using the linear expression of the left end of the original sheet.

Next, referring to the detection signal output by the cover sensor 6, the CPU 31 determines whether the cover 5 is opened (S17). When the CPU 31 determines that the cover 5 is opened (S17: YES), the CPU 31 determines, in S18, whether or not the cover 5 is fully opened (i.e., located to the opened position) or half-opened.

When the cover 5 is not opened (i.e., the cover 5 is in the closed state) (S17: NO), the CPU 31 sets the image processing mode to a "Normal Mode" (S19). When the cover 5 is in the fully-opened state (S18: YES), the CPU 31 sets the image processing mode to a "First Book Mode" (S20). When the cover 5 is in the half-opened state (S18: NO), the CPU 31 sets the image processing mode to a "Second Book Mode" (S21).

When the image processing mode is set to the "Normal Mode" (S22: YES), the CPU 31 calculates a width of the original sheet in the main scanning direction (hereinafter, referred to as an "original sheet width") based on the coordinates of the two corners of the original sheet in the left end portion. When the image processing mode is set to the "Normal Mode," that is, when the cover 5 is in the closed state, it is likely that the original sheet placed on the platen 8 is a sheet-type original sheet, rather than a thick (i.e., a book-type) original sheet.

Accordingly, the CPU 31 sets the original sheet width calculated based on the coordinates of two corners of the original sheet in the left end portion to the image rotation circuit 310, which is configured to apply a rotation correction to the image data in accordance with the tilt angle of the original sheet (S23). Further, the CPU 31 also sets the tilt angle as calculated to the image rotation circuit 310 (S24). Furthermore, the CPU 31 sets an NG threshold value to 3 (S25).

When the image processing mode is set to the "First Book Mode," that is, when the cover 5 is in the fully-opened state, it is likely that the original sheet placed on the platen 8 is very thick and the cover 5 cannot be closed.

When the "First Book Mode" is set, the original sheet is a book-type original sheet and the left end or the rear end of the original sheet may be bent in the midst thereof as the book-type original sheet has a spread. In such a case, appropriate image data may not be obtained based on the original sheet width and the tilt angle, which are obtained based on the two corners of the original sheet in the left end portion, since the scanning area may not be set correctly, and an image chipping may occur.

Therefore, when the image processing mode is set to the "First Book Mode" (S26: YES), the CPU 31 sets the maximum width of the scannable area in the main scanning direction to the image rotation circuit 310 as the original sheet width (S27) instead of the original sheet width calculated from the coordinates of the two corners of the original sheet in the left end portion. Further, the CPU 31 sets zero degree to the image rotation circuit 310 as the tilt angle (S28). The CPU 31 also sets the NG threshold value to 10 (S29).

When the image processing mode is set to neither the "Normal Mode" nor the "First Book Mode" (S26: NO), namely when the image processing mode is set to the "Second Book Mode," the cover 5 is in the half-opened state, and it is likely that the original sheet placed on the platen 8 is a thin book-type original sheet. When the original sheet is of the thin book-type, even if the left end or the rear end of the original is bent in the midst thereof due to the spread of the think book-type original sheet, the amount of the bent when the original sheet is of the thin book-type is assumed to be smaller than that when the original sheet is of the thick book-type.

Alternatively, when the image processing mode is set to the "Second Book Mode," there could be a case where the original placed on the platen 8 is the sheet-type original, but the user may not have closed the cover 5 completely and thus, the cover 5 is in the half-opened state. In this case, the left end or the rear end of the original may not be bent in the midst thereof.

Thus, when the image processing mode is set to the "Second Book Mode," the CPU 31 calculates the original sheet width by adding a particular width to the original sheet width calculated from the coordinates of the two corners of the original sheet in the left end portion, and sets the thus calculated original sheet width to the image rotation circuit 310 (S30). Further, the CPU 31 sets zero degree to the image rotation circuit 310 as the tilt angle of the original sheet (S31). Furthermore, the CPU 31 sets the NG threshold value to 10 (S32).

After setting the type of the original sheet, the tilt angle, and the NG threshold value to the image rotation circuit 310, the CPU 31 transmits the above-processed image data representing an image of the particular number of lines to the image rotation circuit 310 (S33A). Thereafter, the CPU 31 retrieves the subsequent image data for a particular number of lines from the image data stored in the RAM 33 (S33).

Then, based on the image data representing an image of the particular number of lines, the CPU 31 executes a front end detecting process to detect a front end of the original sheet within the image of the particular number of lines of the image data (S34). It is noted that, the CPU 31 only detects whether an end exists in the side end detection process (S34). Since the original sheet width and the tilt angle have been set to the image rotation circuit 310 in S24-S25, S27-S28, or S30-S31, it is not necessary for the CPU 31 to set a position of an end or an amount of the tilt angle to the image rotation circuit 310 at this stage. Thereafter, the CPU 31 determines whether the front end of the original is detected in the front end detecting process (S35).

When the front end is not detected (S35: NO), the CPU 31 increments the value of the NG counter stored in the RAM 33 by one (S36). Then, the CPU 31 determines whether the incremented value of the NG counter exceeds the NG threshold value (S37).

When the value of the NG counter does not exceed the NG threshold value (S37: NO), the CPU 31 transmits the image data for the particular number of lines of image to the image rotation circuit 310 (S38). Thereafter, the CPU 31 retrieves the image data representing an image of the next particular number of lines from the image data stored in the RAM 33 (S39). Then, the CPU 31 returns to S34 and executes the front end detecting process using the image data representing an image of the next particular number of lines.

When the front end is detected in the front end detecting process (S35: YES), the CPU 31 initializes the NG counter to zero (S40). Then, the CPU 31 determines whether the image data stored in the RAM 33 has been retrieved to the right end (S41). When the image data has not been retrieved to the right end (S41: NO), the CPU 31 transmits the currently processed image data representing an image of the particular number of lines to the image rotation circuit 310 (S38), retrieves a next piece of image data representing another image of the subsequent particular number of lines from the image data stored in the RAM 33 (S39), and executes the front end detecting process using the retrieved image data representing the image of the next particular number of line (S34).

When the CPU 31 has retrieved the image data to the right end (S41: YES), the CPU 31 executes a right end detecting process to detect an end corresponding to the right end of the original sheet (S42), and then terminates the original extracting process.

When increment of the NG counter is repeated as the front end is not detected in the front end detecting process (S34, S35: NO, S36, S37: NO), and the count value of the NG counter exceeds the NG threshold value (S37: YES), the CPU 31 executes the right end detecting process (S42), and then terminates the original extracting process.

When, for example, the book-type original sheet is placed on the platen 8 in an orientation shown in the FIG. 4, a central portion, in the right-left direction, of the book-type original sheet rises and spaced from the platen 8. Therefore, at the central portion in the right-left direction, the front end of the original may not be correctly detected. Accordingly, when the original sheet placed on the platen 8 is the book-type original sheet, namely when the image processing mode is set to the "First Book Mode" or the "Second Book Mode," the NG threshold value is set to a greater value compared to the case where the image processing mode is set to the "Normal Mode." Thus, it can be suppressed to terminate the original extracting process in the midst of scanning of the original sheet (i.e., before transmitting all of the image data to the image rotation circuit 310) due to undetection of the front end at the central portion of the book-type original sheet.

Effects

As described above, the cover 5 is provided so as to be openable and closable with respect to the platen 8. When the cover 5 is in the closed state, the platen 8 is covered by the cover 5. When the original placed on the platen 8 is a sheet-type original sheet, the cover 5 can be in the closed state. When the original placed on the platen 8 is a book-type original sheet, the cover 5 cannot be in the closed state.

Therefore, in a state where an original sheet placed on the platen 8 is to be scanned by the CIS unit 11, and when the cover 5 is in the closed state, the original sheet is assumed to be the sheet-type original sheet. In this case, when the image processing is applied to the image data representing an image of the particular number of lines in accordance with the condition of the original sheet width and the tilt angle calculated from the image data for the left end portion of the original sheet, the image chipping (i.e., loss of a part of the image of the original sheet in the scanning result) does not occur.

On the other hand, in a state where the original sheet placed on the platen 8 is to be read by the CIS unit 11, and when the cover 5 is not in the closed state, the original sheet is assumed to be the book-type original sheet. In such a case, when the image processing is applied to the image data for the particular number of lines in accordance with the condition of the original sheet width and the tilt angle calculated from the image data for the left end portions, the image chipping (i.e., loss of a part of the image of the original sheet in the scanning result) could occur.

Therefore, when the cover 5 is not in the closed state, the image processing is performed not in accordance with the condition of the original sheet width or the tilt angle calculated from the image data for the left end portion of the original sheet, but in accordance with a condition which has been determined in advance.

Concretely, when the original sheet placed on the platen 8 is a thick original sheet such as the book-type original sheet, the original sheet width is determined as the maximum width, in the main scanning direction, of the scannable area (i.e., not the original sheet width calculated from the coordinates of the two corners of the left end portion of the original sheet), the tilt angle of the original sheet is determined to be zero, and the above values are set to the image rotation circuit 310 configured to apply the rotation correction to the image data.

When the original sheet placed on the platen 8 is a thin book-type original sheet, the original sheet width is determined adding a particular value to the original sheet width calculated from the coordinates of the two corners of the left end portion of the original sheet, and the tilt angle of the original sheet is determined to be zero, and the above values are set to the image rotation circuit 310.

According to the above configuration, the occurrence of the image chipping can be suppressed.

The image processing is applied to the image data for a particular number of lines corresponding to a part of the scannable area of the CIS unit 11, and such an image processing is repeatedly performed to obtain the image data for the entire image.

Therefore, the scanning result (i.e., the image data) of the entire image of the original sheet can be obtained without the image chipping, within a relatively short period of time since scanning of an unnecessary portion of the recordable area can be omitted.

Modifications

One illustrative configuration according to the embodiment of the present disclosures is explained above. It is noted that the present disclosure is not necessarily be limited to the above configuration, but various modifications may be made within aspects of the present disclosures.

For example, the half-opened state of the cover 5 and the fully-opened state of the cover 5 are distinguished from each other according to the above-described embodiment. However, both of the half-opened state and the fully-opened state can be handled together simply as an "opened state" of the cover 5. In such a modification, as the condition set to the image rotation circuit 310, the width and the tilt angle when the cover 5 is half-opened state may be adopted, or those when the cover 5 is fully-opened state may be adopted.

In the above embodiment, the cover is rotatable around the shaft on the rear-end position of the housing 2. However, the present embodiment does not need to be limited to this example. For example, the cover can be open and close by moving straight up and down. In such a case, a distance from the platen to the cover may be used for determining the image processing mode (e.g., "Normal Mode," "First Book Mode," and "Second Book Mode"). In this meaning, a cover condition detecting sensor may be used as a replacement of the cover sensor 6.

In the above embodiment, the actuator is used as the cover sensor 6 arranged at the rear-end part of the housing 2 to detect the cover status. However, the present embodiment does not need to be limited to this configuration, but any other suitable configuration to detect the open-close status of the cover 6 may be adopted.

What is claimed is:

1. An image scanning device, comprising:
   a platen;
   a cover rotatably provided to the image scanning device, the cover being configured to be opened to expose the platen and closed to cover the platen;
   a cover sensor configured to output a detection signal based on an opening state of the cover;
   a scanning unit configured to sequentially scan an image, within a scannable area, from a first end toward a second end of the scannable area, an original sheet placed on the platen being included in the scannable area, the scanning unit generating image data representing the scanned image;
   a condition setting unit enabling a user to set a first condition to be used when the image is scanned; and
   a controller configured to perform:
   detecting the opening state of the cover based on the detection signal output by the cover sensor; and
   obtaining the image data representing a partial image which is an image of a first end portion of a scannable area of the scanning unit,
   wherein, when the cover is detected to be in the closed state based on the detection signal output by the cover sensor, the controller applies an image processing based on the first condition set through the condition setting unit; and
   wherein, when the cover is detected to be in the opened state based on the detection signal output by the cover sensor, the controller applies the image processing based on a second condition which is a particular condition set in advance and different from the first condition and without using the first condition.

2. The image scanning device according to claim 1, wherein the controller is further configured to obtain the image data representing the partial image of the first end portion of the scannable area, and to perform detecting a first end of the image of the original sheet in the image represented by the obtained image data.

3. The image scanning device according to claim 2, wherein, in the image processing of the partial image, the controller is further configured to perform:
   when the cover is detected not to be in the closed state in the detecting the opening state of the cover, setting a particular width in a main scanning direction which is orthogonal to a sub-scanning direction regardless of a detecting result in the detecting the first end; and
   when the cover is determined to be in the closed state in the detecting the opening state of the cover, setting a set width, in the main scanning direction, set based on the detecting result in the detecting the first end.

4. The image scanning device according to claim 3, wherein the particular width is equal to the width of the scannable area in the main scanning direction.

5. The image scanning device according to claim 3, wherein the image processing includes a rotation correction of an image represented by the image data based on a tilt angle of the original with respect to the main scanning direction; and
wherein the controller is configured to set the tilt angle to zero when the cover is detected not to be in the closed state in the detecting the opening state of the cover.

6. The image scanning device according to claim 5, wherein the controller is further configured to perform:
detecting two corners on the first end side of the original sheet in the image represented by the image data; and
calculating the width and the tilt angle based on positions of the two corners as detected.

7. The image scanning device according to claim 6, wherein the cover sensor is configured to detect whether the cover is in a closed state, a half-opened state or a fully-opened state, a closed state being a state in which an opening amount of the cover is less than a first particular amount, the half-opened state being a state in which the opening amount of the cover is equal to or more than the first particular amount and less than a second particular amount, the fully-opened state being a state in which the opening amount of the cover is more than the second particular amount; and
wherein, in the partial image data processing process, the controller is further configured to:
when the cover is detected to be in the half-opened state based on the detection signal output by the cover sensor in the detecting the opening state of the cover, determine a value greater than the width, which is calculated in the calculating the width and the tilt angle, and smaller than an entire width in the main scanning direction of the scannable area as the particular width; and
when the cover is detected to be in the fully-opened state based on the detection signal output by the cover sensor in the detecting the opening state of the cover, determine the entire width of the scannable area in the main scanning direction as the particular width.

8. The image scanning device according to claim 1, wherein the controller is further configured to perform:
detecting an end of the original sheet in the main scanning direction in the image data obtained in the obtaining the partial image data;
counting a number of undetection of the end in the detecting the end; and
detecting the second end of the original sheet when the number counted in the counting the number of undetection exceeds a particular threshold value.

9. The image scanning device according to claim 1, wherein a mode setting unit is configured to set a manual setting mode in which the scanning by the scanning unit is executed with using set information of the original that is placed on the platen, or an automatic setting mode in which the scanning by the scanning unit is executed without setting the information of the original that is placed on the platen.

10. The image scanning device of claim 1, wherein the image processing includes:
(a) processing a first number of lines of the image provided in the image data;

(b) obtaining data representing a subsequent number of lines of the image;
(c) detecting whether the data representing the subsequent number of lines of the image includes a first end of the original sheet, the first end of the original sheet being defined in a direction orthogonal to a direction extending between the first and second end of the scannable area; and
(d) repeating steps (b) and (c) until the first end of the original sheet is detected or until another condition is satisfied.

11. An image scanning device, comprising:

a platen;

a cover rotatably provided to the image scanning device, the cover being configured to be opened to expose the platen and closed to cover the platen;

a cover sensor configured to output a detection signal based on an opening state of the cover;

a scanning unit configured to sequentially scan an image, within a scannable area, from a first end toward a second end of the scannable area, an original sheet placed on the platen being included in the scannable area, the scanning unit generating image data representing the scanned image; and a controller configured to perform:

detecting the opening state of the cover based on the detection signal output by the cover sensor;

obtaining the image data representing a partial image which is an image of a first end portion of a scannable area of the scanning unit; and setting a first condition based on the partial image to be used an image processing, wherein, when the cover is detected to be in the closed state based on the detection signal output by the cover sensor, the controller applies the image processing based on the first condition, and wherein, when the cover is detected to be in the opened state based on the detection signal output by the cover sensor, the controller applies the image processing based on a second condition which is a particular condition set in advance and different from the first condition and without using the first condition.

* * * * *